United States Patent
Stein

(10) Patent No.: US 6,760,171 B2
(45) Date of Patent: Jul. 6, 2004

(54) MAGNETIC MEDIUM PRECOMPENSATION METHOD AND APPARATUS

(75) Inventor: Anatoli Stein, Atherton, CA (US)

(73) Assignee: Guzik Technical Enterprises, Mountain View, CA (US)

( * ) Notice: Subject to any disclaimer, the term of this patent is extended or adjusted under 35 U.S.C. 154(b) by 191 days.

(21) Appl. No.: 10/074,326

(22) Filed: Feb. 12, 2002

(65) Prior Publication Data

US 2002/0135914 A1 Sep. 26, 2002

Related U.S. Application Data

(60) Provisional application No. 60/278,111, filed on Mar. 23, 2001.

(51) Int. Cl.[7] ................................................ G11B 5/09
(52) U.S. Cl. .............................. 360/45; 360/53; 360/65
(58) Field of Search .............................. 360/45, 46, 51, 360/32, 39, 40, 53, 65, 31, 25, 68, 67, 8; 341/126, 144, 68, 69, 72, 50, 55, 100

(56) References Cited

U.S. PATENT DOCUMENTS

| | | | | | |
|---|---|---|---|---|---|
| 4,725,901 A | * | 2/1988 | Eiberger | ...................... | 360/45 |
| 6,091,558 A | * | 7/2000 | Voorman | ...................... | 360/46 |
| 6,133,861 A | | 10/2000 | Jusuf et al. | | |
| 6,157,506 A | | 12/2000 | Ueno | | |
| 6,212,024 B1 | * | 4/2001 | Igarashi | ...................... | 360/51 |

* cited by examiner

Primary Examiner—Alan T. Faber
(74) Attorney, Agent, or Firm—McDermott, Will & Emery

(57) ABSTRACT

A magnetic medium write precompensation circuit produces a precisely controlled delay for magnetic medium write precompensation by digital-to-analog converting a data value, low-pass filtering the digital-to-analog converted signal, and limiting the filtered signal to produce a desired time delay. One or more of the digital-to-analog conversion levels, limiting levels, and filter cutoff levels determines the amount of the delay. Feedback control may be employed to adjust the digital-to-analog conversion level, filtering, and/or the limiting level to thereby adjust the compensation time delay.

33 Claims, 5 Drawing Sheets

MAGNETIC MEDIUM PRECOMPENSATION METHOD AND APPARATUS

CROSS-REFERENCE TO RELATED APPLICATIONS

This application claims the benefit of U.S. Provisional Application No. 60/278,111 entitled "METHOD AND APPARATUS FOR PATTERN GENERATOR WITH BIT PRE-COMPENSATION" filed on Mar. 23, 2001, the disclosure of which is hereby incorporated by reference in its entirety.

FIELD OF THE INVENTION

The invention relates to a method and apparatus for delaying an electronic signal transition, and, more particularly, to delaying signal transitions written to a magnetic storage medium in a way that reduces or eliminates non-linear bit shifts during a subsequent read operation.

BACKGROUND OF THE INVENTION

Conventional magnetic storage devices typically read and write data onto one or more data tracks in a magnetic storage medium. In a conventional hard disk drive, for example, the data tracks are concentric rings on one or both surfaces of a disk or plurality of disks. To write data to a track, the disk is rotated at a predetermined rate and a magnetic write head floating over the track transforms electrical signals representative of the data to be written to magnetic field transitions on the track which similarly represent the data. A small magnetic domain on the track represents each bit. Shifting the orientation of magnetization from one domain to another creates "transitions." When a floating magnetic read head passes over transition, the read head produces an electrical pulse.

Digital data is thus stored on conventional magnetic storage devices as the presence or absence of magnetic transitions. When read, the transitions generate a magnetic pulse at a bit time may represent a bit value of one and the absence of a pulse may represent a bit value of zero, for example. A bit clock, which determines the bit time, may be embedded in the data and recovered upon reading data from the disk, for example. Various encoding schemes may be employed in the storage of such data. Non-return to zero inverted (NRZI) encoding, for example, employs a pulse to represent a one and the absence of a pulse to represent a zero. A string of three ones would therefore be represented as three consecutive shifts in the orientation of magnetization in the magnetic medium.

A variety of imperfections, such as inter-symbol interference, pulse compression, pulse-edge displacement or non-linear transition shifts due to non-linearities in the recording medium, may shift transitions, or pulses, from their nominal "bit-time" locations. Various methods have been employed to precompensate for these imperfections. Precompensation schemes are discussed, for example, in U.S. Pat. No. 6,133,861 issued to Jusuf et. al., and U.S. Pat. No. 6,157,506 issued to Ueno, both of which are hereby incorporated by reference in their entirety. Precompensation approaches typically delay a write signal in order to shift the location of the data domain written by the write head, thereby positioning the domain closer to a compensated position, that is, a position which results in a read bit being coincident with a bit time.

However, conventional precompensation schemes provide only limited flexibility in the selection of delays, thereby limiting the amount by which a written magnetic domain may be shifted and, therefore, limiting the amount of precompensation available. A flexible system and method for precompensating disk write signals would therefore be highly desirable.

SUMMARY

In a system and method in accordance with the principles of the present invention, a magnetic medium write precompensation circuit produces a precisely controlled delay for magnetic medium write precompensation by digital-to-analog converting a data value (which may be encoded), low-pass filtering the digital-to-analog converted signal, and limiting the filtered signal to produce a desired time delay corresponding to a desired positional shift of the signal transition as written to the magnetic medium. For a given limiting level, the degree to which the amplitude of the signal transition is adjusted determines the amount of the delay. That is, a "partial amplitude" signal is added to a signal, then filtered. The filtered resultant signal is limited at a level that provides a desired time-compensation for an output write signal.

In an illustrative embodiment, converting a single-bit data value to a multi-bit value, then converting the multi-bit value to a multi-level output signal via a digital-to-analog converter (DAC) produces the "partial amplitude" signal. The single-bit value may be referred to as a one or a zero may be represented by high or low voltage values, positive or negative current, and may employ positive or negative logic. Depending upon circuit timing, the multi-level output signal may take the form of a single output at one of several possible levels or it may be a series of signals at a variety of the possible output levels, with the filtered signal limited at a level that provides a desired write delay.

BRIEF DESCRIPTION OF THE DRAWINGS

The above and further features, aspects, and advantages of the invention, will be apparent to those skilled in the art from the following detailed description, taken together with the accompanying drawings in which.

DETAILED DESCRIPTION

Figure 1:
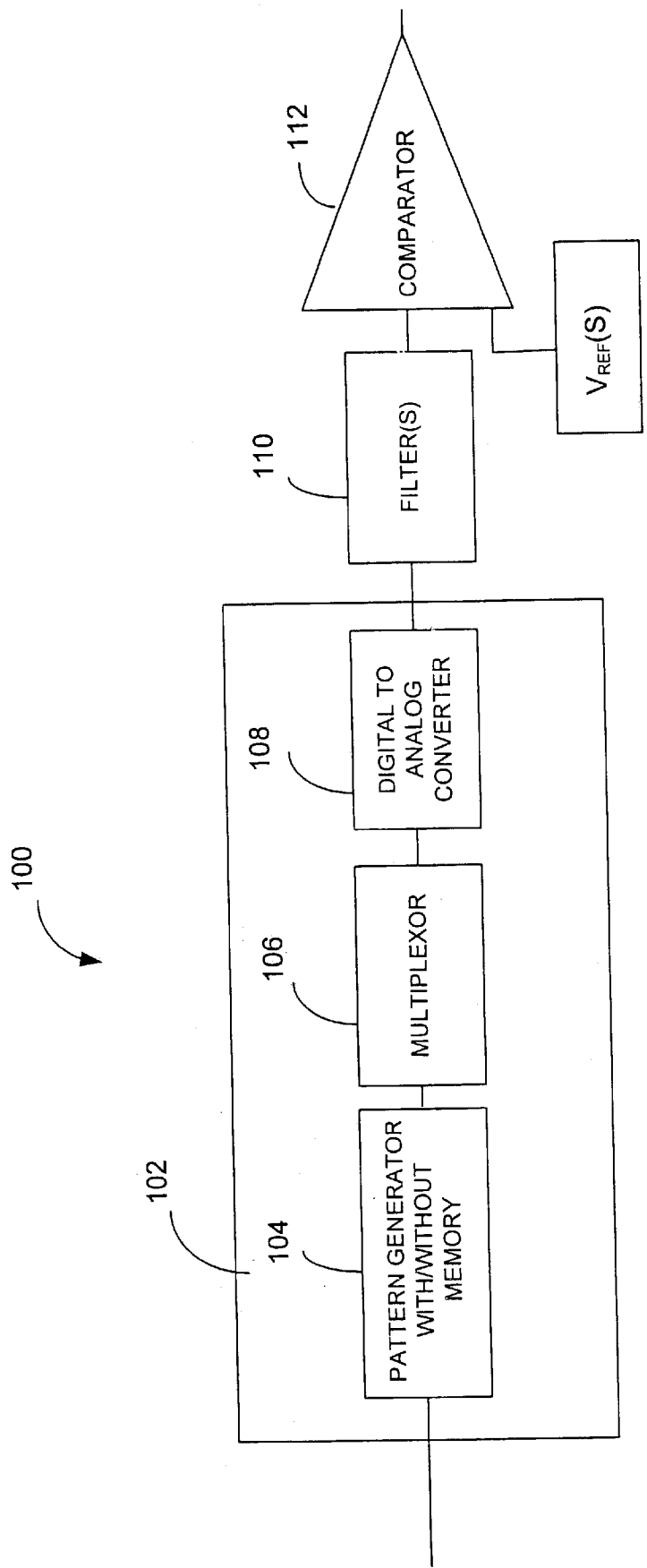
FIG. 1 is a more detailed conceptual block diagram of magnetic medium-write precompensation system in accordance with the principles of the present invention.

An illustrative alternative embodiment of a write precompensation system 100 in accordance with the principles of the present invention is depicted in the conceptual block diagram of FIG. 1. In this illustrative embodiment, the digital-to-analog converter subsystem 102 includes a pattern generator 104, a multiplexor 106, and a DAC 108. In operation, the pattern generator 104 accepts data, such as NRZI data and creates channel code, that is, the code that is to be written to a magnetic medium. In this illustrative embodiment, the channel code produced by the pattern generator 104 is a multi-bit code. That is, for each bit of data received at the pattern generator 104, the pattern generator 104 produces a multi-bit output. In this embodiment, each multi-bit output is converted by the DAC 108 to an "analog" value. A pattern memory may be employed to produce the desired multi-bit output.

Due to the limited speed of memory devices, a multiplexor 106 may be employed to select among a plurality of pattern generator memory components (not shown) to thus supply the DAC 108 with multi-bit values for conversion at a higher rate than would be permitted by the memory access time of a single memory. That is, for example, a pattern generator memory may generate an eight-bit value for a given single-bit data input, another pattern generator memory may generate an eight-bit value for the next sequential data bit, and so on. At some point, the sequence repeats from the first pattern generator memory. As the pattern generator memories are being accessed, the multiplexor "loops through" the outputs from the first pattern generator memory to the last, supplying the DAC 108 with a sequence of eight-bit values corresponding to the sequence of single-bit input values. In an illustrative embodiment in which a precompensation system in accordance with the principles of the present invention employs a DAC 108 with sufficient conversion speed, the pattern generator 104 may produce a plurality of multi-bit values for each data input. In this way, the digital-to-analog converter subsystem 102 may produce a plurality of variable voltage outputs for each data input, thereby yielding a more precise delay, as discussed in the description related to FIG. 3. The multiplexor 106 may play the additional role of level-shifting the data value from the pattern generator 104 to levels required by the DAC 108. For example, the pattern generator 104 may be implemented in CMOS memory technology, with outputs at CMOS levels. If the DAC 108 is implemented in a different technology, such as ECL, the multiplexor 106 may convert the CMOS output a from the pattern generator 104 to an ECL output that is compatible with the DAC 108, for example.

The pattern generator 104, multiplexor 106, and DAC 108 are clocked at rates that accommodate one another. That is, if the DAC 108 produces an output signal capable of having two different variable-voltage output levels for each data bit received at the pattern generator 104, and the pattern generator 104 includes four pattern memories through which the multiplexor loops sequentially to feed the DAC, each pattern memory is clocked at one half the bit rate and the multiplexor and DAC are clocked at twice the bit rate. Additionally, the cutoff frequency of the filter 110 may be adjusted proportionally to accommodate adjustments to the DAC conversion rate. For example, if the conversion speed is doubled, the filter cutoff frequency is doubled to achieve a proportional interpolation. In an illustrative embodiment, the precompensation system 100 may modify the filter cutoff frequency by switching filters having different cutoff frequencies in and out of the signal path, or by adjusting the parameters of a programmable filter. In this way, a precompensation system 100 in accordance with the principles of the present invention may modify the filter characteristics, DAC conversion speed, and the number of variable outputs dedicated to each input data bit, all during one bit time. This permits the precompensation system 100 to fine-tune delays in response to variations in a particular medium, for example. In this illustrative embodiment a comparator 112 connected to compare the output of the filter 110 to a reference voltage Vref operates as a limiter.

Figure 2:
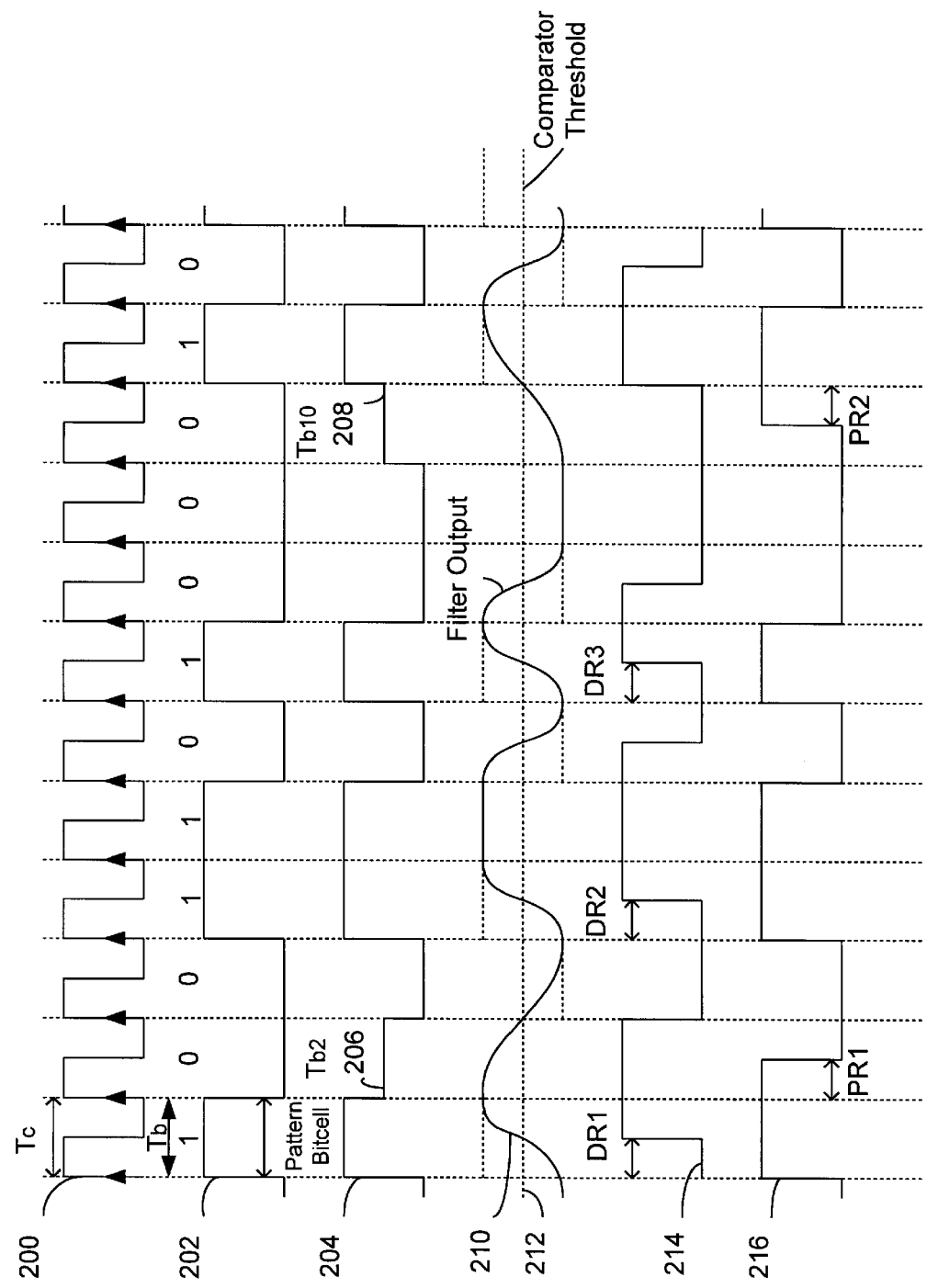
FIG. 2 includes graphical representations of waveforms which illustrate the process by which a magnetic medium write precompensation system in accordance with the principles of the present invention creates delays suitable for precompensation signals.
Figure 3:
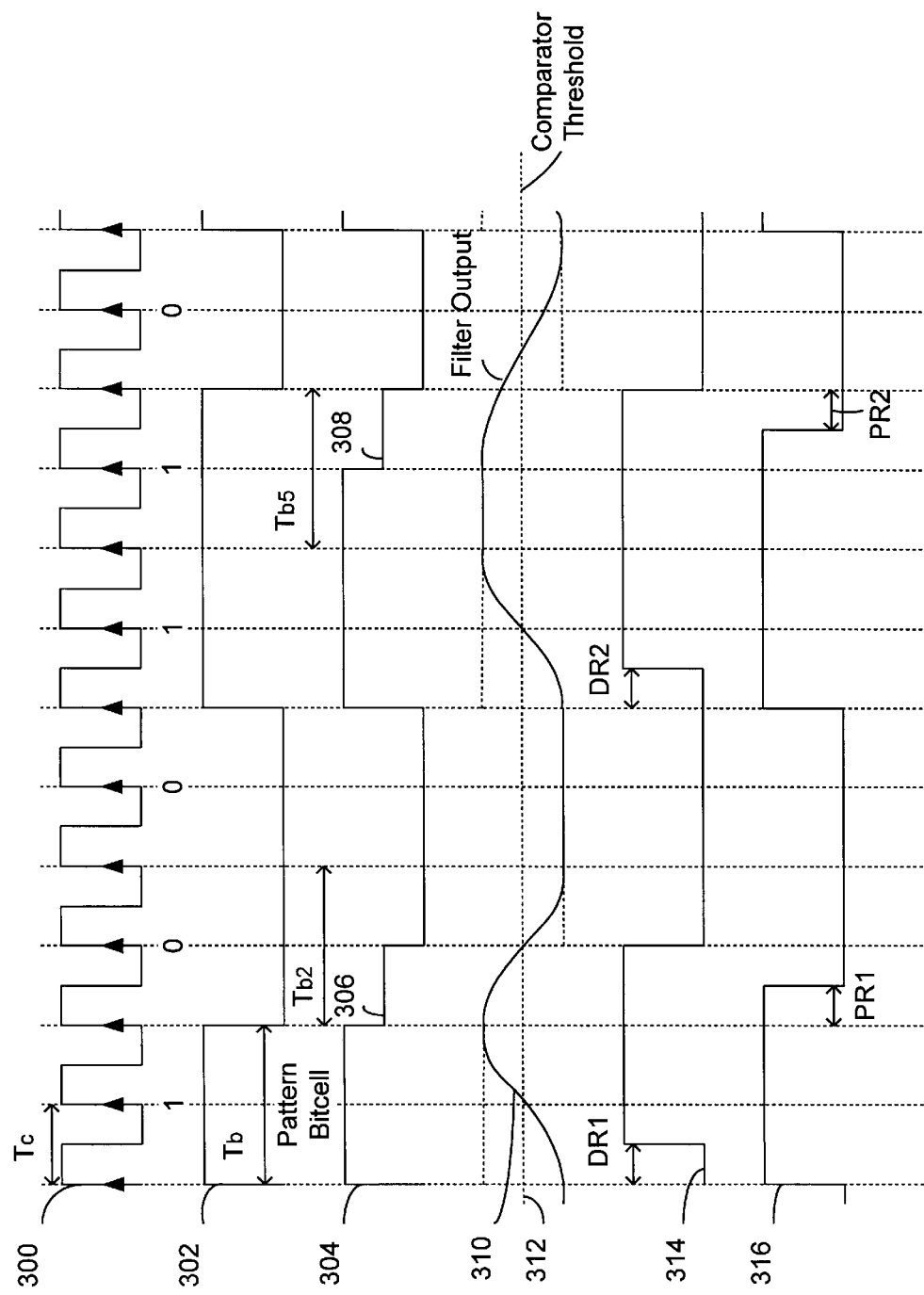
FIG. 3 includes graphical representations of waveforms which illustrate the process by which a magnetic medium write precompensation system in accordance with the principles of the present invention creates delays suitable for precompensation signals using a plurality of variable voltage outputs per bit time.

The operation of a precompensation system in accordance with the principles of the present invention, including the effects of the digital-to-analog converter 108, filter 110 and limiter 111, is depicted in greater detail by the signal diagrams of FIGS. 2 and 3. In the embodiment of FIG. 2, the precompensation system 100 uses a signal capable of taking on one variable—voltage output per data bit to produce a precompensated transducer drive signal. The waveform 200 is that of the basic clock signal that drives the precompensation system 100. In this embodiment, a bit time Tb is demarcated by each rising edge of the clock waveform. That is, the bit time is equal to the clock time Tc, and the digital-to-analog conversion has the capability of changing the amplitude of its output substantially simultaneously with the rising edge of the clock signal. The waveform 202 is that of a binary signal such as might be provided, (as data-to-be-written) to the precompensation circuit 100. Each bit of the waveform occupies one bit time Tb. As previously noted, although the input waveform 202 may represent raw data, more frequently the data received by the precompensation system, that is, the data represented by waveform 202, is encoded using an encoding scheme, such as NRZ or NRZI encoding.

The waveform 204 represents a variable-voltage output such as might be created by a digital-to-analog converter 102 in accordance with the principles of the present invention. As previously described, the digital-to-analog converter 102 may take the form of a DAC, which allows for 2n different variable voltage levels (where n is the number of bits used to specify the value to be converted by the DAC). In this illustrative example, the precompensation system 100 produces half-scale output voltages 206 and 208, respectively, during the second bit time Tb2 and tenth bit time Tb10, in order to produce precompensating delays, as will be described in greater detail below. Low pass filtering the digital-to-analog converted waveform 204 yields the waveform 210. The broken line 212 indicates the threshold level of the limiter 111.

The waveform 214 corresponds to the output of the limiter 111 (which changes state as the signal 210 passes the comparator threshold). Rising edge delays created by the combination of the variable voltage level output, filtering and limiting are designated DR1, DR2, DR3. The precompensator 100 creates the delay DR1, for example, by adding the variable output voltage of Tb2. Low-pass filtering the waveform 204 smoothes and shifts the rising and falling edges of the transitions to yield the waveform 210, and, depending upon the amplitude of the precompensation value (e.g., 206) shifts the falling edge of the transition further. Or, in the case of the precompensation value 208 which is added before the rising edge of bit time Tb11, the precompensation value has the effect of eliminating the filter's delaying effect and, as indicated by the waveform 216, having the net effect of a "positive" delay. Limiting the filtered waveform creates a sequence that is generally aligned with a "bit time" clock corresponding to the divisions of magnetic domains on a recording medium, such as a magnetic disk. The "bit time" clock may be recovered from the data by means known in the art.

The waveform 216 represents the channel code, or drive signal, used to energize an electromagnetic transducer and thereby control the magnetization, particularly the magnetization transitions, of domains within a magnetic medium and to thereby record the data represented by the waveform 202. In this illustrative example, a precompensator in accordance with the principles of the present invention precompensates a transition from a data value of "one" to "zero" with two zeroes trailing in sequence, by adding that portion of the drive signal labeled PR1. Similarly, the precompensator precompensates a transition from a data value of "zero" to "one" with three sequential leading zeroes, by adding that portion of the drive signal labeled PR2. As illustrated by waveforms 202, 204, 210, 214, and 216, the amount of delay created by the precompensator may be adjusted by varying a variable voltage output such as 206. As previously noted the amplitude of a variable voltage output such as 206 may be modified by adjusting a DAC, the cutoff frequency of a filter 110 may be modified by switching filters having different cutoff frequencies in and out of the signal path, and the limiter threshold may be similarly adjusted, for example, by switching different references in and out of the comparator circuit 112. The cutoff frequency of the filter 110 may be modified in proportion to the modification of the DAC conversion frequency, so that, for example, the filter 110 cutoff frequency would be doubled for a doubling of the DAC conversion frequency, for example.

In the illustrative embodiment of FIG. 3, the precompensation system 100 employs an output signal capable of taking on a plurality of variable-voltage levels per data bit to produce a precompensated transducer drive signal. The waveform 300 is that of the basic clock signal that drives the precompensation system 100. In this illustrative embodiment, a bit time Tb is demarcated by a plurality of rising edges (two in this example) of the clock waveform. That is, the bit time is greater than the clock time Tc (Tb=2Tc in this example), and the digital-to-analog conversion has the capability of changing the amplitude of its output a plurality of times within each bit time, thus permitting finer adjustments of precompensation delays. The waveform 302 is that of a binary signal such as might be provided to the precompensation circuit 100. Each bit of the waveform occupies one bit time Tb (i.e., 2Tc clock times). As previously noted, although the input waveform 302 may represent raw data, more frequently the data received by the precompensation system, that is, the data represented by waveform 302, is encoded using an encoding scheme, such as NRZ or NRZI encoding. The waveform 304 represents a variable-voltage output such as might be created by a digital-to-analog converter 102 in accordance with the principles of the present invention. As previously described, the digital-to-analog converter 102 may take the form of a DAC, which allows for $2^n$ different variable voltage levels (where n is the number of bits used to specify the value to be converted by the DAC). In this example, the precompensation system 100 produces half-scale output voltages 306 and 308 respectively during portions of the second bit time Tb2 and fifth bit time Tb5, in order to produce precompensating delays, as will be described in greater detail below. Low pass filtering the digital-to-analog converted waveform 304 yields the waveform 310. The broken line 312 indicates the threshold level of the limiter 111.

The waveform 314 corresponds to the output of the limiter 111. Rising edge delays created by the combination of the variable voltage level output, filtering and limiting are designated DR1 and DR2. The precompensator 100 creates the delay DR1, for example, by adding the variable output voltage during a first portion of the bit time Tb2. Low-pass filtering the waveform 304 smoothes and shifts the rising and falling edges of the transitions to yield the waveform 310, and, depending upon the amplitude of the precompensation value (e.g., 306) shifts the falling edge of the transition further. Or, in the case of a precompensation value that is added before the rising edge of a bit time, the precompensation value has the effect of eliminating the filter's delaying effect and having the net effect of a "positive" delay. Limiting the filtered waveform creates a sequence that is generally aligned with a "bit time" clock corresponding to the divisions of magnetic domains on a recording medium, such as a magnetic disk. The "bit time" clock may be recovered from the data by means known in the art.

The waveform 316 represents the channel code, or drive signal, used to energize an electromagnetic transducer and thereby control the magnetization, particularly the magnetization transitions, of domains within a magnetic medium and to thereby record the data represented by the waveform 302. In this example, a precompensator in accordance with the principles of the present invention precompensates a transition from a data value of "one" to "zero" with two zeroes trailing in sequence, by adding that portion of the drive signal labeled PR1. Similarly, the precompensator precompensates a transition from a data value of "zero" to "one" with a single trailing zero, by adding that portion of the drive signal labeled PR2. In an embodiment in which the precompensator may provide more than one variable-voltage output for each bit time, the amount of precompensation delay may be adjusted more finely. As illustrated by waveforms 302, 304, 310, 314, and 316, the amount of delay created by the precompensator may be adjusted by varying a variable voltage output such as 306. As previously noted the amplitude of a variable voltage output such as 306 may be modified by adjusting a DAC, the cutoff frequency of a filter 110 may be modified by switching filters having different cutoff frequencies in and out of the signal path, and the limiter threshold may be similarly adjusted, for example, by switching different references in and out of the comparator circuit 112. The cutoff frequency of the filter may be modified in proportion to modifications to the DAC conversion frequency.

Figure 4:
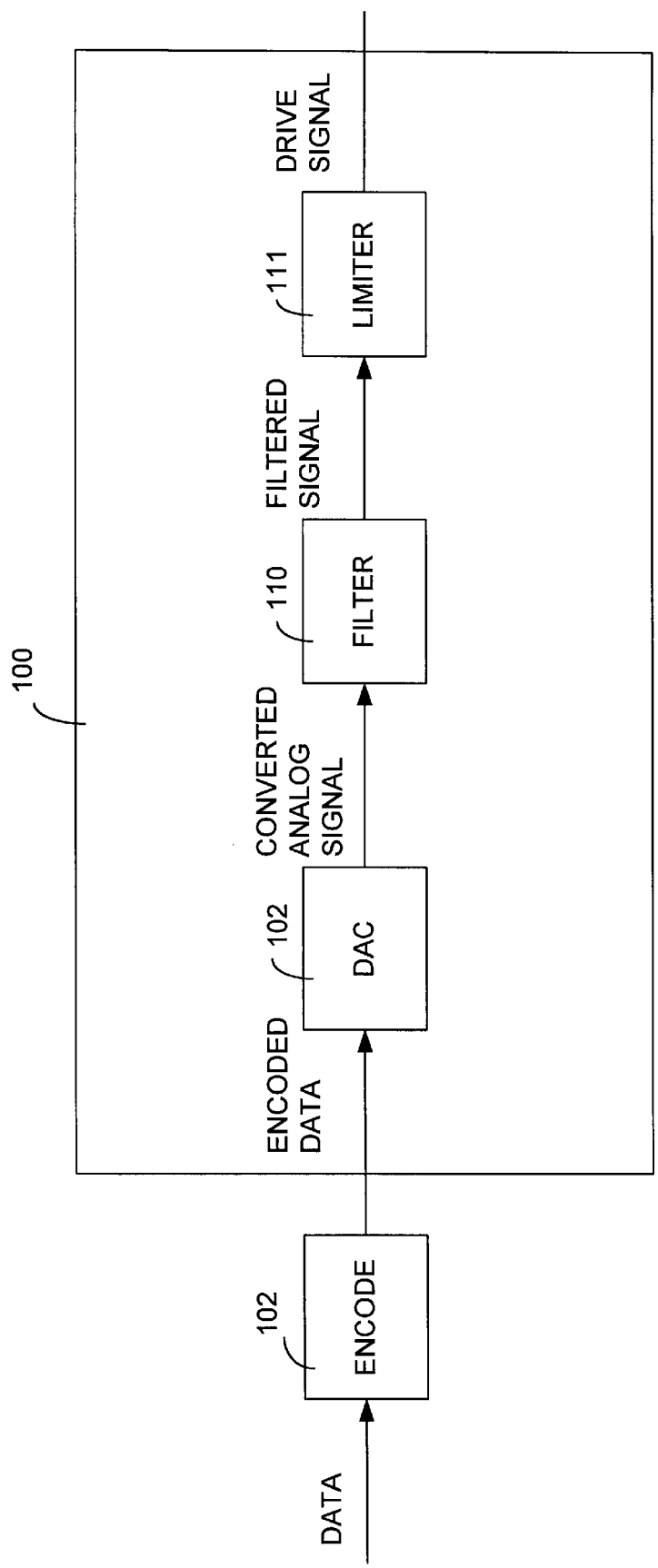
FIG. 4 is a conceptual block diagram of a magnetic medium-write precompensation system in accordance with the principles of the present invention.

In a system and method in accordance with the principles of the present invention, a magnetic medium write precompensation circuit produces a precisely controlled delay for magnetic medium write precompensation by digital-to-analog converting a data value, then filtering and limiting the digital-to-analog converted signal to produce magnetic medium write drive signal having a desired time delay. The block diagram of FIG. 4 shows an exemplary magnetic medium precompensation system 100 in accordance with the principles of the present invention. The system 100 is responsive to the receipt data that is encoded by an encoder 400. Typically, before data is written to a magnetic medium, it is encoded, using NRZ or NRZI encoding, for example, to reduce the likelihood of errors during readback. Such encoding may be used in conjunction with the invention and, consequently, this description and Figures may refer to encoded data. However, the benefits of the invention are available independent of encoding or encoding type.

The magnetic medium compensation system 100 includes, in series, a digital to analog converter 102, a filter 110 and a limiter 111. In operation, the digital-to-analog converter 102 varies the amplitude of the encoded data signal to produce an "analog" data signal. The digital-to-analog conversion may be performed at different rates, as described in the discussion related to FIGS. 2 and 3, thus yielding one or more output levels each bit time. In an illustrative embodiment of the invention, a low pass filter 110 filters the digital-to-analog converted signal. The low pass filter 110 may be implemented, for example, as a programmable low pass filter or a bank of low pass filters adapted for selective insertion in the signal flow path. Given such a selectable filter embodiment, filter cutoff frequencies may be selected to provide a desired interpolation of amplitude outputs. For example, if the conversion rate of the digital to analog converter is doubled, the cutoff frequency may adjusted to accommodate doubling of the conversion frequency in order to maintain a desired relationship between output level from the DAC, conversion frequency, and a limiting threshold for the limiter 111, which limits the filtered, digital-to-analog converted signal to produce a current drive signal. The drive signal is used to "write' the input data to a magnetic domain within a magnetic medium, thus storing the (typically encoded) data. The digital to analog conversion, filtering and limiting characteristics of system 100 effect a modification of the nominal position of the data on the medium. The limiting threshold is set to produce a given delay for a given digital-to-analog conversion. Feedback control may be employed to adjust the amplitude of the digital-to-analog converted signals or the limiting threshold, thereby adjusting the time delays to accommodate varying conditions, such as temperature variations or variations in the magnetic recording medium, for example.

Figure 5:
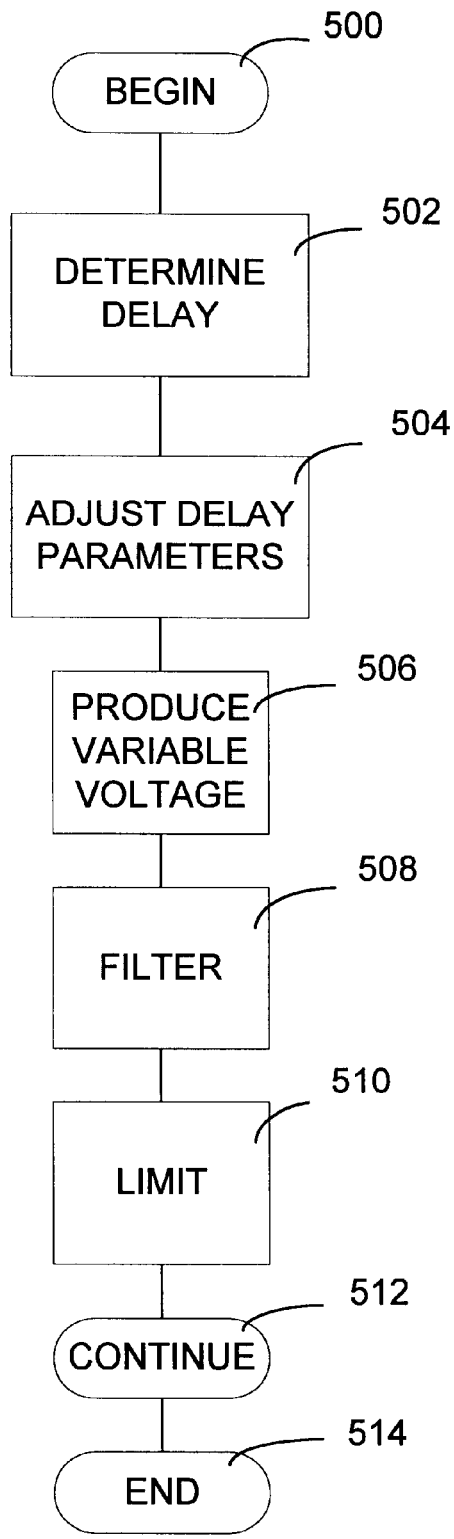
FIG. 5 is a flowchart depicting the process of magnetic medium precompensation in accordance with the principles of the present invention.

The flowchart of FIG. 5 depicts the operation of a precompensation process in accordance with the principles of the present invention. The process begins in step 500 and proceeds to step 502 where precompensation delay requirements are determined. This determiniation may be based on measurements made regarding the quality of the media to which data is to be written, or regarding the quality of the transducer that is to do the writing, for example. From step 502 the process proceeds to step 504 where one or more precompensation delay parameters in accordance with the principles of the present invention are adjusted to yield the desired delays as determined in step 502. As described in greater detail in the discussion related to the previous figures, parameters such as the amplitude of variable-voltage outputs, filter cutoff frequencies, and/or limiter thresholds may be adjusted to modify the precompensation delay. From step 504 the process proceeds to step 506 where the precompensator produces a variable-voltage output corresponding to input data. As previously described, the variable-voltage output may be produced by a DAC, for example. From step 506 the process proceeds to step 508 where the variable-voltage output is low-pass filtered to impart a slope to the rising and falling edges of the variable-voltage output. After filtering in step 508 the process proceeds to step 510 where the filtered output is limited to produce a channel-code drive signal. From step 510 the process proceeds to step 512, where the precompensator continues processing data as it arrives, or, when the disk drive shuts down, for example, the process proceeds to end in step 514.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate object or processor instructions, or in hybrid implementations that utilize a combination of hardware logic, software logic and/or firmware to achieve the same results. Variable-level signals may be implemented in a variety of ways, including variable-voltage or variable current implementations. Processes illustrated through the use of flow charts may not be strictly linear processes and alternative flows may be implemented within the scope of the invention. The specific configuration of logic and/or instructions utilized to achieve a particular function, as well as other modifications to the inventive concept are intended to be covered by the appended claims.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A magnetic medium-write precompensation system comprising:
   a digital to analog converter (DAC) responsive to the reception of a binary input signal by producing a DAC output signal;
   a filter responsive to the reception of the DAC output signal by producing a filtered output signal; and
   a limiter responsive to said filtered output by producing a substantially binary output magnetic medium-write drive signal.

2. The system of claim 1 wherein the DAC is responsive to a transition in the binary output signal by producing a DAC output.

3. The system of claim 1 wherein the filter is a plurality of filters each of which is switchable into and out of the signal path between the digital-to-analog converter and the limiter.

4. The system of claim 1 wherein the DAC comprises:
   a pattern generator responsive to the reception of a single-bit digital data input by creating a multi-bit data output; and
   a DAC responsive to the reception of multi-bit data output from the pattern generator by producing the DAC output.

5. The system of claim 4 wherein the DAC output generator further comprises:
   a multiplexor configured to loop through a plurality of multi-bit outputs provided by the pattern generator and to thereby supply multi-bit data values to the DAC at a higher rate than otherwise available from the pattern generator.

6. The system of claim 5 wherein the pattern generator produces a multi-bit pattern corresponding to an output from the DAC that is at neither extreme of the DAC output range in response to the reception of a transition in the input data from a one to a plurality of zeroes.

7. The system of claim 5 wherein the pattern generator produces a multi-bit pattern corresponding to an output from the DAC that is at neither extreme of the DAC output range in response to the reception of a transition in the input data from a zero to a plurality of ones.

8. The system of claim 5 wherein the pattern generator produces a multi-bit pattern corresponding to an output from the DAC that is at neither extreme of the DAC output range in response to the reception of a transition in the input data from a plurality of ones to a zero.

9. The system of claim 5 wherein the pattern generator produces a multi-bit pattern corresponding to an output from the DAC that is at neither extreme of the DAC output range in response to the reception of a transition in the input data from a plurality of zeroes to a one.

10. The system of claim 1 wherein the filter is a programmable filter.

11. The system of claim 1 wherein the limiter is configured to limit the filtered output by comparing the filtered output to a reference voltage.

12. The system of claim 11 wherein the limiter is further configured to switch any of a plurality of voltage references into or out of the limiting circuit and to thereby compare the filtered output to any of the switchable voltage references.

13. A magnetic medium-write precompensation system comprising:
- a pattern generator responsive to the reception of a single-bit digital data input by creating a multi-bit data output data;
- a digital-to-analog converter (DAC) responsive to the reception of multi-bit data by producing a DAC output;
- data a multiplexor configured to loop through a plurality of multi-bit data outputs and to thereby supply multi-bit data values to the DAC at a higher rate than otherwise available from the pattern generator;
- a filter responsive to the reception of the DAC output signal by producing a filtered output signal; and
- a limiter responsive to said filtered output by producing a substantially binary output magnetic medium-write drive signal.

14. The system of claim 13 wherein the pattern generator comprises a memory circuit that stores a multi-bit pattern corresponding to a single bit input data value.

15. The system of claim 14 wherein the memory device stores a plurality of multi-bit patterns corresponding to a multi-bit input data value.

16. A method for producing a delay for magnetic medium-write precompensation comprising the step of:
- (A) generating a DAC output in response to the reception of a binary input signal;
- (B) filtering the DAC output signal; and
- (C) limiting the filtered DAC output signal.

17. The method of claim 16 wherein the generating of a DAC is in response to a transition in the binary output signal.

18. The method of claim 16 wherein the step (B) of filtering comprises:
- (B1) switching one of a plurality of filters into the signal path to filter the DAC output.

19. The method of claim 16 wherein the step (B) of filtering comprises:
- (B2) adjusting the cutoff frequency of a filter.

20. The method of claim 16 wherein the step (A) of generating a DAC output comprises:
- (A1) generating a multi-bit data pattern corresponding to a single bit digital data input; and
- (A2) producing a DAC output from a DAC in corresponding to the multi-bit pattern.

21. The method of claim 20 wherein the step of generating a DAC output comprises:
- (A3) multiplexing a plurality of multi-bit patterns provided by a pattern generator to thereby supply multi-bit patterns to the DAC at a higher rate than otherwise available from the pattern generator.

22. The method of claim 21 wherein the step of generating a DAC output comprises:

(A4) the pattern generator generating a multi-bit pattern corresponding to an output from the DAC that is at neither extreme of the DAC output range in response to the reception of a transition in the input data from a one to a plurality of zeroes.

23. The method of claim 21 wherein the step of generating a DAC output comprises:

(A5) the pattern generator generating a multi-bit pattern corresponding to an output from the DAC that is at neither extreme of the DAC output range in response to the reception of a transition in the input data from a zero to a plurality of ones.

24. The method of claim 21 wherein the step of generating a DAC output comprises:

(A6) the pattern generator generating a multi-bit pattern corresponding to an output from the DAC that is at neither extreme of the DAC output range in response to the reception of a transition in the input data from a plurality of ones to a zero.

25. The method of claim 21 wherein the step of generating a DAC output comprises:

(A7) the pattern generator generating a multi-bit pattern corresponding to an output from the DAC that is at neither extreme of the DAC output range in response to the reception of a transition in the input data from a plurality of zeroes to a one.

26. A method of precompensating a magnetic medium-write signal comprising the steps of:
- (A) generating a DAC output in response to the reception of a binary input signal, filtering the DAC output signal, and limiting the filtered DAC output signal to produce a delayed magnetic medium-write signal;
- (B) determining the efficacy of the delayed signal produced in step (A);
- (C) adjusting the delay produced in step (A) to improve the efficacy as determined in step (B).

27. A magnetic medium-write precompensation system comprising:
- A. means for receiving a data signal including a succession of levels, each level occurring in an associated bit period, and being equal to one of two predetermined binary levels,
- B. digital to analog conversion means responsive to the occurrence of a predetermined sub-pattern of transitions between said binary levels in each succession of said data signal, for generating a digital to analog converted signal substantially the same as said data signal except that the level corresponding to at least one bit period associated with said sub-pattern is at a level L, where L is between the two predetermined binary levels,
- C. a low pass filter responsive to said digital to analog converted data signal to generate a filtered data signal, wherein said low pass filter is characterized by a cutoff frequency Fc,
- D. a limiter responsive to said filtered data signal for generating a write-drive signal, said limiter having a characteristic threshold TH, whereby said write-drive signal has a first binary value when said filtered data signal is above TH and has a second binary value when said filtered data signal is below TH, wherein L, Fc and TH to effect a predetermined delay D in a binary level transition in said write-drive signal relative to the corresponding binary level transition in said data signal.

28. A system according to claim 27 wherein said limiter is a comparator adapted to compare said filtered data signal to a reference voltage.

29. A system according to claim 27 wherein said low pass filter is programmable whereby Fc is a value selected from a plurality of predetermined values.

30. A system according to claim 29 wherein Fc varies as a function of time.

31. A system according to claim 27 wherein L is a value selected from a plurality of predetermined values.

32. A system according to claim 29 wherein L is determined from said sub-pattern.

33. A system according to claim 27 wherein L varies as a function of time.

* * * * *

UNITED STATES PATENT AND TRADEMARK OFFICE
CERTIFICATE OF CORRECTION

PATENT NO. : 6,760,171 B2
DATED : July 6, 2004
INVENTOR(S) : Anatoli Stein

It is certified that error appears in the above-identified patent and that said Letters Patent is hereby corrected as shown below:

Column 9,
Line 22, from the beginning, delete "data".

Signed and Sealed this

Twenty-first Day of September, 2004

JON W. DUDAS
*Director of the United States Patent and Trademark Office*